MAGNETIC RECORDING AND REPRODUCTION STABILIZING SYSTEM

Filed Jan. 30, 1964

Inventors:
Yoshiro Nishiwaki and
Takahiro Suzuki,
By Pierce Scheffler & Parker
their Attorneys United States Patent Office 3,231,668

Patented Jan. 25, 1966

3,231,668

MAGNETIC RECORDING AND REPRODUCTION STABILIZING SYSTEM

Yoshiro Nishiwaki and Takahiro Suzuki, Yokohama, Japan, assignors to Victor Company of Japan, Limited, Yokohama, Japan, a corporation of Japan Filed Jan. 30, 1964, Ser. No. 341,848
Claims priority, application Japan, Sept. 9, 1960, 35/37,840
2 Claims. (Cl. 178—6.6)

Figure 1:
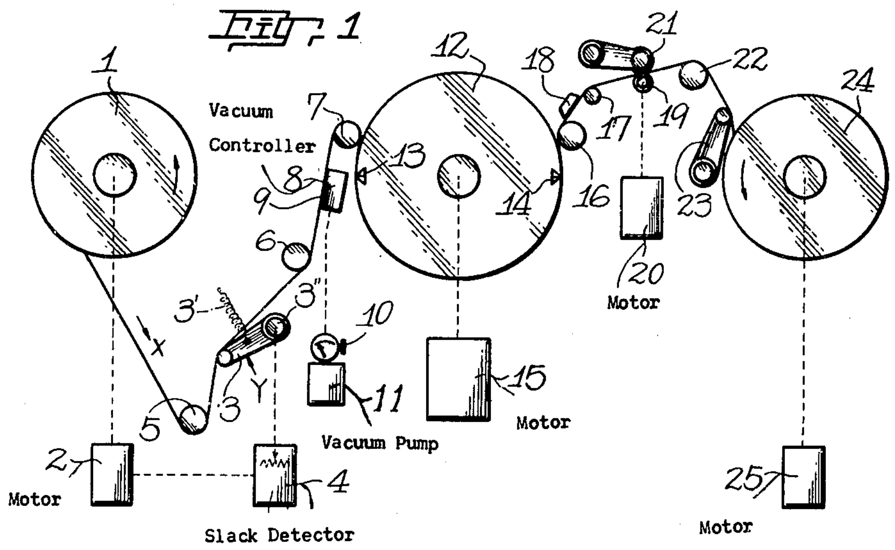

This invention relates to improvements in a magnetic recording and reproducing system for recording television video signals on a magnetic tape and reproducing them. This application contains subject matter in common with our U.S. patent application Serial No. 125,794, filed July 21, 1961, now abandoned, and is to be considered to be a continuation-in-part of the latter.

An object of the present invention is to provide a system for stabilizing magnetic recording and reproduction for carrying out stabilized effective recording and reproduction in a system for recording television video signals diagonally in sufficiently long tracks on a magnetic tape over a comparatively long time and reproducing them. More specifically, the invention is concerned with a so-called two-head type magnetic recording and reproducing system for television video signals wherein two magnetic heads operate alternately so that each of the magnetic heads may scan parallel tracks on a magnetic tape in sufficient length diagonally to the lengthwise direction of the tape to record, or to reproduce, one field or one frame of television video signals as a unit.

In this type of magnetic recording and reproducing apparatus for television video signals, since the video signals are recorded in parallel tracks diagonally in sufficient length on a magnetic tape, in reproducing these signals the tracks in which the signals are recorded must be scanned by a reproducing head with strict fidelity under the same condition as obtained during the recording, and there is required a much higher accuracy than in the case of the commoner mode of magnetic tape recording and reproduction of sounds.

However, in recording and reproducing such video signals, at the time of recording, the recordation will not—for the following causes—be able to be carried out under a strictly constant condition; and, at the time of reproduction, the reproduction also will not be carried out under exactly the same condition as at the time of recording. Thus perfect recordation and reproduction of video signals heretofore have not been effected, and therefore it has been difficult to obtain favorable reproduced pictures.

The main causes of these undesired effects have been found to include: the influence of the elongation and contraction of the magnetic tape due to the changes of ambient temperature and humidity; the influence of the fluctuation of the tension of the magnetic tape in the part where the recording and reproduction are carried out by the magnetic head; and the difference of the winding condition of the magnetic tape on the supply reel at the time of running the magnetic tape.

The present invention has been able to eliminate the above mentioned defects and disadvantages.

A principal object of the present invention is to carry out stabilized recording and reproduction effectively by eliminating imperfect reproduction due to the influence of elongation or contraction of the magnetic tape.

Another object of the invention is to carry out stabilized recording and reproduction effectively by keeping the tension of the magnetic tape constant.

A further inventive object is to carry out stabilized recording and reproduction effectively by keeping constant the contact pressure between the magnetic tape and the magnetic head.

According to the present invention, in transporting a magnetic tape the magnetic tape is fed at a speed higher than its normal transporting speed so that slack may be given always to the magnetic tape on the supply side. A vacuum controller for sucking the magnetic tape is disposed at least just before the recording and reproducing part so that, by properly regulating and controlling the suction pressure of said vacuum controller, a braking force may be given in the lengthwise direction of the magnetic tape to regulate and render uniform the tension of said magnetic tape, and said slack of the magnetic tape from the magnetic tape supply side is regulated by the later described means to attain the above mentioned objects of the present invention.

Figure 2:
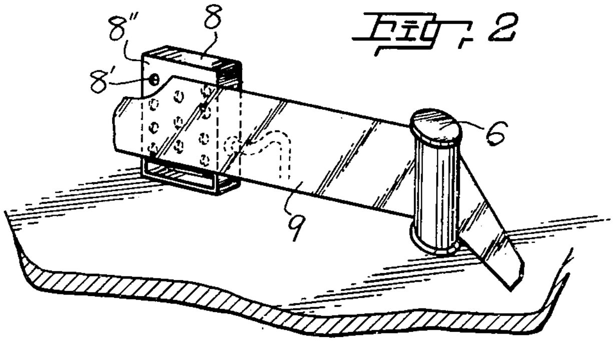

The invention will now be described in greater particularity and with reference to the accompanying drawing, in which:

FIG. 1 is a schematic view showing the basic formation of an embodiment of the system for stabilizing magnetic recording and reproduction according to the present invention; and FIG. 2 is a partial perspective view showing the magnetic tape as brought into contact with the vacuum controller surface in the embodiment of the system for stabilizing magnetic recording and reproduction according to the present invention.

The present invention shall now be detailed with reference to the embodiment illustrated in the drawings, so that what is intended in the invention may become clear.

Illustrated in FIG. 1 is an embodiment of a magnetic recording and reproducing apparatus to which is applied the stabilizing system of the present invention. At 1 is represented a supply reel on which is wound a magnetic tape 9. 2 is a supply reel driving motor directly coupled to said supply reel. 3 is a tension arm interposed between the supply reel 1 and the later described guide drum 12 and brought into loose contact with the magnetic tape 9. 3' is a spring for said tension arm. 3'' is a rotary shaft for said tension arm and is operatively coupled with a tape slack detecting mechanism 4 electrically connected with said supply reel driving motor 2. 5, 6 and 7 are guide rollers suitably arranged between the supply reel 1 and guide drum 12 to guide the magnetic tape 9. 8 is a vacuum controller to suck air while in contact with substantially the entire breadth of that part of magnetic tape 9—just before said guide drum—which is in contact with substantially half the periphery of the guide drum, so that signals may be recorded or reproduced on said magnetic tape 9. 11 is a vacuum pump operatively connected to said vacuum controller 8. 10 is a leak-in valve for regulating the suction pressure of the vacuum pump 11. 13 and 14 are rotary magnetic heads for recording and reproducing video signals provided rotatably within said guide drum 12 and fitted in symmetrical positions, separated by 180 degrees from each other, to a rotary disk (not illustrated). 15 is a rotary magnetic head driving motor for rotating said rotary magnetic heads. 16, 17 and 22 are guide rollers suitably arranged between the guide drum 12 and a take-up reel 24 to guide the magnetic tape 9. 18 is fixed magnetic head for recording sounds and other control signals. 19 is a rotatable capstan rotated by a capstan driving motor 20. 21 is a pinch roller for pressing the above mentioned magnetic tape 9 against said capstan 19. 23 is a tension arm. 25 is a take-up reel driving motor for rotating the above mentioned take-up reel 24.

FIG. 2 shows the magnetic tape 9 as brought into contact with the vacuum controlling surface having suction ports 8' of the above mentioned vacuum controller 8.

The operation of the system illustrated in FIGS. 1 and 2 at the time of recording shall now be explained. First of all, when the magnetic tape 9 is hung on the guide drum 12 as in FIG. 1 and as described above and the rotatable capstan 19 is rotated by the capstan driving motor 20, said magnetic tape will be fed in the direction indicated by the arrow "X." Here, the capstan 19 is rotated at a constant velocity, the supply reel driving motor 2 for rotating the supply reel 1 is rotated at a velocity higher than the normal feeding velocity in the initial period so that slack may be imparted to the magnetic tape 9 payed out by said supply reel and then the velocity is restored to normal (whereby the initial slack is maintained). The magnetic tape 9 payed out by said supply reel is always regulated at a tension lower than the tension of the magnetic tape on the take-up side by the tension arm 3 provided between the above mentioned guide drum 12 and supply reel 1. The vacuum controller 8 is provided for the magnetic tape 9 substantially just before the tape enters into contact with the guide drum 12 so that said magnetic tape 9 may be sucked into contact with said controller.

Further, the vacuum controller 8 here has any plurality of suction ports 8' provided on the side which is adapted to be in contact with the magnetic tape 9, and a suction pressure is imparted to said vacuum controller through a pipe (indicated in dotted line) from the vacuum pump 11 having the leak-in valve 10 for regulating the suction pressure so that the magnetic tape 9 may be sucked. Therefore, the tension of the magnetic tape 9 in contact with the guide drum 12 or the recording and reproducing part will be made constant by said vacuum controller and the contact pressure of said magnetic tape with the rotary magnetic heads 13 and 14 will be made always uniform so that favorable recording and reproduction may be carried out.

Further, in the illustration, the magnetic tape 9 payed out by the supply reel 1 is always lightly pressed in the direction indicated by the arrow "Y" through the tension arm 3 biased by the spring 3'. In case the magnetic tape 9 fluctuates, said tension arm 3 will swing clockwise or anticlockwise around the rotary shaft 3'' as a center, the signal detected by the tape slack detecting mechanism 4 operatively connected with said rotary shaft will be fed back to an electric source controlling device (not shown) for the supply reel driving motor 2 so that the input voltage for the motor may be varied and the feed-out velocity of the magnetic tape 9 may be regulated.

The case of reproducing the signals thus recorded on the magnetic tape 9 shall now be explained. In such case, the operations other than that of the vacuum controller 8 are exactly the same as in the above mentioned case of recording and shall not be re-explained in detail. If the magnetic tape 9 is fed in the direction indicated by the arrow "X" and the rotary magnetic heads 13 and 14 are being rotated, the respective rotary magnetic heads will scan the magnetic tape 9 and therefore the signals recorded in said magnetic tape should be reproduced. However, in fact, due to such various causes as the deformation (mostly the elongation or contraction) of the magnetic tape 9 and the wear of the rotary magnetic heads 13 and 14, the magnetic tape 9 and the rotary magnetic heads 13 and 14 will not move relatively under exactly the same conditions as in recording and therefore no favorable reproduction will be able to be carried out under conventional conditions of operation.

The present invention solves this difficulty, and carries out reproduction by regulating the suction pressure by means of the vacuum pump 11 having the leak-in valve 10 coupled with the vacuum controller 8. Now, if the magnetic tape 9 at the time of reproduction elongates—to be a little longer than at the time of recording—the record tracks recorded in said magnetic tape will naturally also elongate and therefore if the records are reproduced as they are, various troubles, needless to say, will occur. Therefore, if the suction pressure of the vacuum controller 8 is regulated by means of the leak-in valve 10 to be a little lower than at the time of recording, as the rotating velocity of the capstan feeding the tape is constant, the tension of the magnetic tape 9 in the part in contact with the rotary magnetic heads 13 and 14 will become lower and, when the records are thus reproduced, the effective length of the magnetic tape 9 in said part will become smaller, the elongation of the record tracks due to the elongation of said tape will be compensated and the reproduction will be carried out in a correct state. Also due to the wear of the rotary magnetic heads 13 and 14, there will be the same result as is mentioned above, that is, as of the elongation of the magnetic tape 9. Therefore, the same as in the above, the suction pressure of the vacuum controller 8 may be regulated to be lower than at the time of recording.

Further, on the contrary, in case the magnetic tape 9 contracts, contrary to the above mentioned cases, the suction pressure of the vacuum controller 8 may be made higher so that the effective length of the magnetic tape 9 in the part in contact with the rotary magnetic heads 13 and 14 may be greater in the reproduction.

As detailed in the above, according to the present invention, specifically in a magnetic recording and reproducing apparatus for recording and reproducing television video signals diagonally in comparatively long tracks on a magnetic tape, some slack is given to the above mentioned magnetic tape fed out of a supply reel, a vacuum controller for sucking the magnetic tape while in contact with the substantially entire width of the tape is arranged for the magnetic tape substantially just before a so-called recording and reproducing part where rotary magnetic heads scan said magnetic tape to carry out recording or reproduction, and the suction pressure of said vacuum controller is able to be properly regulated and controlled. Therefore, in this type of magnetic recording and reproducing apparatus wherein precise recording and reproduction are required, that is, an apparatus for magnetically recording and reproducing television video signals diagonally in comparatively long tracks on a magnetic tape, the present invention has great features that the tension of the magnetic tape can be made constant and the influence of the deformation or mostly the elongation or contraction of the magnetic tape at the time of reproduction, that is, the imperfect reproduction due to the deviation of the scanning positions by the magnetic heads at the time of recording and at the time of reproduction, can be compensated by regulating the suction pressure of the above mentioned vacuum controller.

We claim:

1. A magnetic recording and reproducing stabilizing system comprising a supply reel on which is wound a magnetic tape;

a reel motor connected to said supply reel;

a guide drum provided rotatably with at least one magnetic head to record and reproduce on the magnetic tape one field or one frame of television video signal as a unit and having a surface on which the magnetic tape is guided for a comparatively long section;

a vacuum controller provided so as to be in contact with the magnetic tape between said guide drum and said supply reel, to suck the magnetic tape and to apply a braking force in the longitudinal direction of the tape to said tape at least on said guide drum;

means for controlling the suction pressure of said vacuum controller to give an expansion and a contraction to said magnetic tape so that length of recorded tracks at reproduction is made to be the same with that of the case of recording;

means for detecting looseness of the magnetic tape between said vacuum controller and said supply reel;

means for giving a predetermined slight slack to the magnetic tape between said vacuum controller and said supply reel by controlling rotation of said reel motor in accordance with variation of looseness of the magnetic tape as detected by said means for detecting;

a capstan and a pinch roller provided on the side of the magnetic tape fed out of said guide drum; and a take-up reel on which the magnetic tape from said supply reel is wound up while in contact with said vacuum controller, guide drum, magnetic heads in said guide drum and capstan and pinch roller.

2. A magnetic recording and reproducing stabilizing system comprising a supply reel on which is wound a magnetic tape;

a reel motor connected to said supply reel;

at least one tension arm set on the running side of said magnetic tape, adapted to detect the looseness of the magnetic tape as payed out of said supply reel;

means for controlling the rotating speed of said reel motor by converting the displacement of said tension arm as detected into an electric signal;

a guide drum provided rotatably with at least one magnetic head and having a surface on which the magnetic tape is guided for a comparatively long section;

a vacuum controller provided between said guide drum and said tension arm so as to suck the magnetic tape and to apply a braking force in the longitudinal direction of the tape to said tape at least on said guide drum;

means for controlling the suction pressure of said vacuum controller, said control means including a vacuum pump, a leak-in valve and a pipe communicating between said pump and said vacuum controller through said leak-in valve;

a capstan and a pinch roller provided on the side of the magnetic tape fed out of said guide drum; and a take-up reel on which the magnetic tape from said supply reel is wound up while in contact with said tension arm, vacuum controller, guide drum, magnetic heads in said guide drum and capstan and pinch roller.

References Cited by the Examiner

UNITED STATES PATENTS

| | | | |
|---|---|---|---|
| 2,814,676 | 11/1957 | House | 179—100.2 |
| 2,952,010 | 9/1960 | Demer | 340—174.1 |
| 2,994,489 | 8/1961 | Hare | 242—75.2 |

DAVID G. REDINBAUGH, *Primary Examiner.*

H. W. BRITTON, *Assistant Examiner.*